(12) United States Patent
Harada et al.

(10) Patent No.: US 8,964,930 B2
(45) Date of Patent: Feb. 24, 2015

(54) COUPLING STRUCTURE OF FUEL ASSEMBLY

(75) Inventors: Hidenori Harada, Kobe (JP); Masahiko Yamada, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 406 days.

(21) Appl. No.: 12/601,681

(22) PCT Filed: Dec. 11, 2008

(86) PCT No.: PCT/JP2008/072569
§ 371 (c)(1),
(2), (4) Date: Jan. 20, 2010

(87) PCT Pub. No.: WO2009/084402
PCT Pub. Date: Jul. 9, 2009

(65) Prior Publication Data
US 2010/0119031 A1    May 13, 2010

(30) Foreign Application Priority Data

Dec. 28, 2007    (JP) .................. 2007-339284

(51) Int. Cl.
G21C 3/32    (2006.01)
G21C 3/334   (2006.01)
G21C 3/33    (2006.01)

(52) U.S. Cl.
CPC .............. *G21C 3/334* (2013.01); *G21C 3/3315* (2013.01); *G21Y 2002/303* (2013.01); *G21Y 2002/304* (2013.01); *G21Y 2004/301* (2013.01); *Y02E 30/40* (2013.01)
USPC ......................................... 376/437; 376/446

(58) Field of Classification Search
USPC ................................. 376/437, 446
See application file for complete search history.

(56) References Cited

U.S. PATENT DOCUMENTS 3,828,868 A * 8/1974 Jabsen ......................... 376/440
4,064,004 A   12/1977 Long et al.
(Continued)

FOREIGN PATENT DOCUMENTS

JP    52-102987 A    8/1977
JP    59-12383 A     1/1984
(Continued)

OTHER PUBLICATIONS

International Seach Report of PCT/JP2008/072569, mailing date of Mar. 3, 2009.
(Continued)

*Primary Examiner* — Timothy A Brainard
(74) *Attorney, Agent, or Firm* — Westerman, Hattori, Daniels & Adrian, LLP

(57) ABSTRACT

A coupling structure of a fuel assembly includes a screw coupling means to provide a coupling structure of a fuel assembly which prevents foreign matters from mixing in the fuel and in which no vertical play is generated at a fitting portion between a latch sleeve 10 and a lock key 20. The coupling structure of the fuel assembly includes: the latch sleeve 10 having a projecting portion 11 formed at an upper end portion thereof; an upper nozzle 30 having formed therein a latch sleeve installation hole 31 into which the upper end portion of the latch sleeve 10 is inserted; and the lock key 20 which is installed inside the latch sleeve installation hole 31, and which has an opening portion 21 formed on a bottom surface thereof, the opening portion 21 having a shape corresponding to the projecting portion 11. The screw coupling means screw couples the lock key 20 to the upper nozzle 30 with a male screw thread 23 formed on a side surface of the lock key 20.

5 Claims, 12 Drawing Sheets

(56) References Cited

U.S. PATENT DOCUMENTS

| | | | | |
|---|---|---|---|---|
| 4,684,503 | A | * | 8/1987 | Shallenberger ............... 376/446 |
| 5,268,948 | A | | 12/1993 | Church et al. |
| 5,363,423 | A | | 11/1994 | Brashier et al. |
| 5,490,190 | A | * | 2/1996 | Hopkins et al. ............... 376/364 |
| 5,844,958 | A | * | 12/1998 | Leroux et al. ................. 376/446 |

FOREIGN PATENT DOCUMENTS

| | | | |
|---|---|---|---|
| JP | 59-012383 | A | 1/1984 |
| JP | 59-12384 | A | 1/1984 |
| JP | 59-24290 | A | 2/1984 |
| JP | 59-024290 | A | 2/1984 |
| JP | 61-124890 | A | 6/1986 |
| JP | 3-238396 | A | 10/1991 |
| JP | 7-63873 | A | 3/1995 |
| JP | 07-063873 | A | 3/1995 |
| JP | 07-104083 | A | 4/1995 |
| JP | 7-104083 | A | 4/1995 |
| JP | 09-512095 | A | 12/1997 |
| JP | 9-512095 | A | 12/1997 |

OTHER PUBLICATIONS

International Search Report of PCT/JP2008/072569, dated of mailing Mar. 3, 2009.

Extended European Search report dated Oct. 16, 2013, issued in European Patent Application No. 08866538.5.

* cited by examiner

Fig.8
(a)
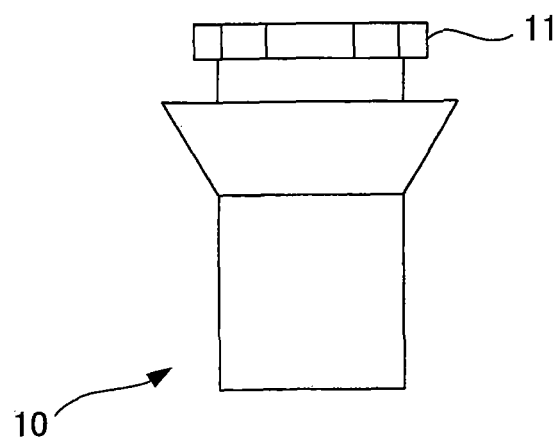
(b)
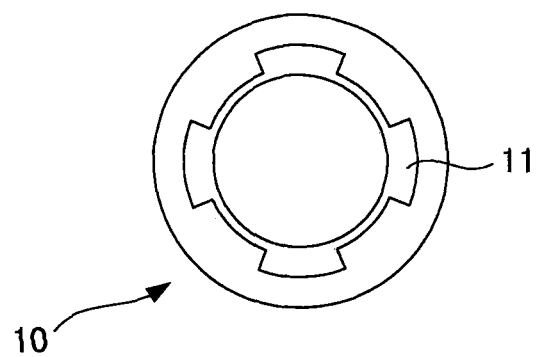

COUPLING STRUCTURE OF FUEL ASSEMBLY

FIELD OF INVENTION

The present invention relates to a coupling structure of a fuel assembly.

BACKGROUND ART

As shown in FIG. 11, a fuel assembly of a pressurized-water nuclear reactor is configured of fuel rods 100, an upper nozzle 101, a lower nozzle 102, guide tubes 103, an upper support lattice 104, an intermediate support lattice 105, a lower support lattice 106, and a foreign matter filter. The upper support lattice 104 and the intermediate support lattice 105 are mechanically joined to the guide tubes 103, and the lower support lattice 106 is mechanically joined to lower ends of the guide tubes 103 together with the lower nozzle 102. The upper support lattice 104, the intermediate support lattice 105, and the lower support lattice 106 hold the fuel rods 100. As shown in FIG. 12, the upper nozzle 101 is joined, by welding, to upper end portions 108 of sleeves 107 attached to the upper support lattice 104. Moreover, the sleeves 107 and the guide tubes 103 are mechanically joined to each other, respectively.

In such a fuel assembly, there is a case where the upper nozzle 101 of the fuel assembly is required to be detached in a power plant in order to, for example, replace the fuel rod 100 which has been damaged during an operation. Accordingly, the fuel assembly must be designed so that the upper nozzle 101 is detachable. However, the upper nozzle 101 is conventionally joined to the sleeves 107 by welding as described above, and therefore, cannot be easily detached and attached in the power plant.

In this respect, a coupling structure of a fuel assembly using a nut 111 is known as an upper nozzle attachment/detachment structure enabling attachment and detachment of the upper nozzle 101. In this structure, as shown in FIG. 13, a male screw thread 109 is formed on the upper end portion of the guide tube 103. The guide member 103 is fastened and fixed in a clamping manner to the nut 111 having a female screw thread 112 formed on its inner surface through a locking cup 110 provided in the upper nozzle 101 (see Patent Document 1 mentioned below).

Further, a coupling structure of a fuel assembly using a locking ring is known as the upper nozzle attachment/detachment structure. In this structure, a projecting portion is provided on the guide tube 103. The locking ring (omitted from the drawings) is attached to the upper nozzle 101 and is rotated with the projecting portion being inserted into an opening portion of the locking ring. Thereby, the projecting portion of the guide tube 103 overlaps a receiver portion of the locking ring, and the guide tube 103 and the upper nozzle 101 are thus coupled to each other (see Patent Document 2 mentioned below).

Patent Document 1: Japanese Patent Application Publication No. Sho. 59-12383

Patent Document 2: Specification of U.S. Pat. No. 5,844,958

DISCLOSURE OF THE INVENTION

Problems to be Solved by the Invention

However, in the above-described conventional coupling structure of the fuel assembly using the nut 111, the detached nut 111 may fall and be mixed into the fuel during work, which can be a cause of foreign matter damage.

Meanwhile, in the above-described conventional coupling structure of the fuel assembly using the locking ring, a gap is formed between the bottom surface of the projecting portion of the guide tube 103 and the receiver portion of the locking ring, within manufacturing tolerances of each of the guide tube 103 and the locking ring. As a result, a vertical play is generated at the fitting portion between the projecting portion of the guide tube 103 and the locking ring, that is, the attachment/detachment portion of the upper nozzle.

In view of such problems, an object of the present invention is to provide a coupling structure of a fuel assembly which eliminates a factor leading to mixing of a detached component in the fuel assembly by eliminating the need for disassembling components at the time of attachment and detachment of an upper nozzle, and in which no vertical play is generated at an attachment/detachment portion of the upper nozzle.

Means for Solving the Problems

To solve the above problems, a first aspect of the present invention provides a coupling structure of a fuel assembly including: a latch sleeve having a projecting portion formed at an upper end portion thereof; an upper nozzle having formed therein a latch sleeve installation hole into which the upper end portion of the latch sleeve is inserted; and a lock key which is installed inside the latch sleeve installation hole, and which has an opening portion formed in a bottom surface thereof, the opening portion having a shape corresponding to the projecting portion. The latch sleeve and the lock key are coupled to each other by rotating the lock key with the upper end portion of the latch sleeve being inserted into the lock key. The coupling structure of the fuel assembly characterized by including a screw coupling means for screw-coupling the lock key to the upper nozzle side with a male screw thread formed on a side surface of the lock key.

To solve the above problems, a second aspect of the present invention provides the coupling structure of a fuel assembly according to the first aspect of the present invention, which is characterized in that the screw coupling means screw-couples the lock key and the latch sleeve installation hole with a female screw thread formed on an inner surface of the latch sleeve installation hole.

To solve the above problems, a third aspect of the present invention provides the coupling structure of a fuel assembly according to the first aspect of the present invention, which is characterized in that: the screw coupling means includes a cylindrical thick-walled pipe installed in the latch sleeve installation hole, the thick-walled pipe having a female screw thread thread formed in an inner surface thereof; and the screw coupling means screw-couples the lock key and the thick-walled pipe by installing the lock key in the thick-walled pipe.

Effects of the Invention

According to the present invention, a coupling structure of a fuel assembly is achieved which eliminates a factor leading to mixing of a detached component in the fuel assembly since there is no need to disassemble the components at the time of attachment and detachment of the upper nozzle, and in which no vertical play is generated at an attachment/detachment portion of the upper nozzle.

BRIEF DESCRIPTION OF THE DRAWINGS

FIG. 8 is a view showing an example in which a projecting portion of the latch sleeve is a flower shape in the coupling structure of the fuel assembly according to the present invention.

BEST MODES FOR CARRYING OUT THE INVENTION

Embodiments of a coupling structure of a fuel assembly according to the present invention will be described hereinafter with reference to the drawings.

Firstly, described is an example of a structure of a latch sleeve according to the coupling structure of the fuel assembly of the present invention.

Figure 4:
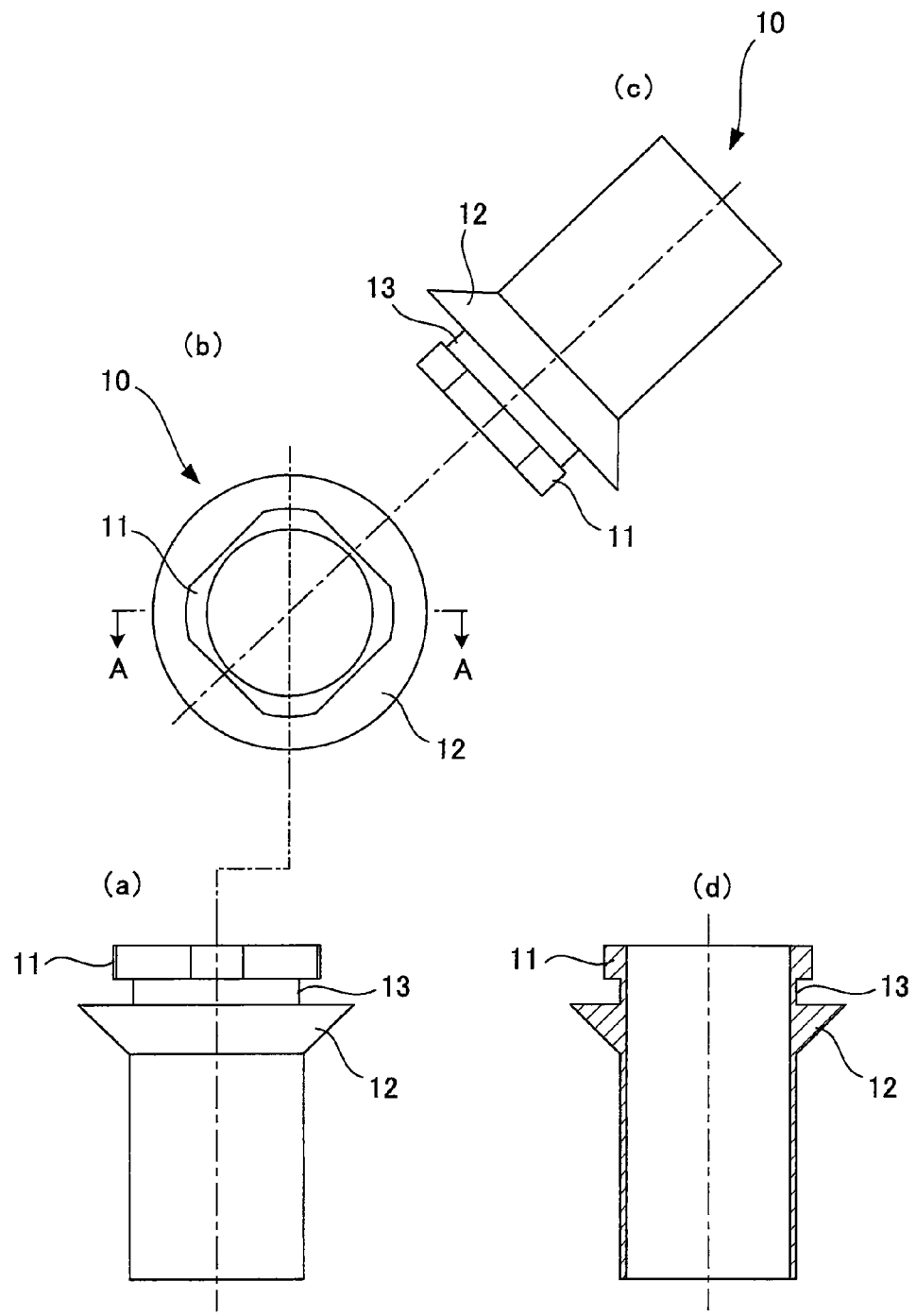
FIG. 4 is a view showing an example of a structure of a latch sleeve in a coupling structure of a fuel assembly according to the present invention.

In FIG. 4, parts (a) and (c) of FIG. 4 are side views of the latch sleeve; part (b) of FIG. 4 is a top view of the latch sleeve; and part (d) of FIG. 4 is a cross-sectional view of the latch sleeve taken along a cross section A-A shown in part (b) of FIG. 4.

As shown in FIG. 4, a latch sleeve 10 is cylindrical, and includes a projecting portion 11 formed at an upper end portion of the latch sleeve 10, the projecting portion 11 having a shape of a square with its corners rounded when viewed from the top. A flange portion 12 is formed at a portion below the latch sleeve projecting portion 11. The flange portion 12 vertically fixes the latch sleeve 10 with a later-described upper nozzle 30 (see FIG. 6) or with a thick-walled pipe 40 that is inserted into the upper nozzle 30 and joined thereto by welding.

A gap portion 13 is formed between the latch sleeve projecting portion 11 and the flange portion 12.

Next, described is an example of a structure of a lock key according to the coupling structure of the fuel assembly of the present invention.

Figure 5:
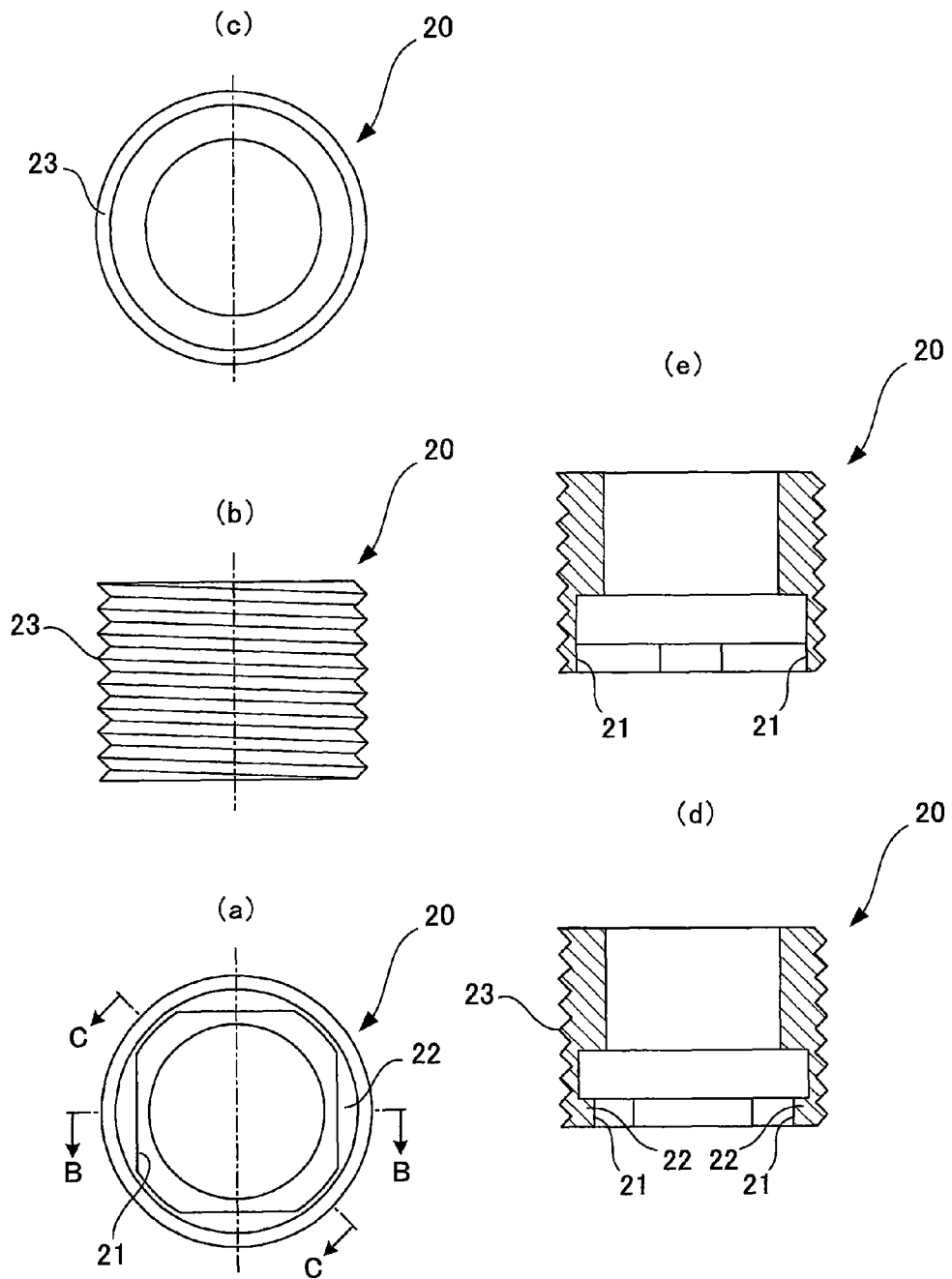
FIG. 5 is a view showing an example of a structure of a lock key in the coupling structure of the fuel assembly according to the present invention.

In FIG. 5, part (a) of FIG. 5 is a bottom view of the lock key; part (b) of FIG. 5 is a side view of the lock key; part (c) of FIG. 5 is a top view of the lock key; part (d) of FIG. 5 is a cross-sectional view taken along a cross section B-B shown in part (a) of FIG. 5; part (e) of FIG. 5 is a cross-sectional view taken along a cross section C-C shown in part (a) of FIG. 5.

As shown in FIG. 5, a lock key 20 is cylindrical, and includes a lock key opening portion 21 formed at its bottom surface, the lock key opening portion 21 having a shape of a square with its corner rounded so that the latch sleeve projecting portion 11 (see FIG. 4) may fit therein. Each of four sides of the lock key opening portion 21 where the wall is thick is a receiver portion 22. A male screw thread 23 is formed on a side surface of the lock key 20.

Figure 7:
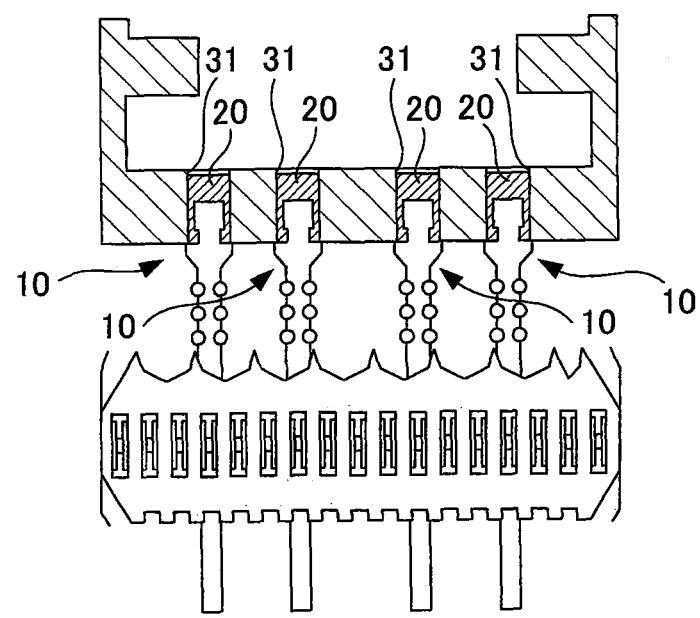
FIG. 7 is a view showing a coupling state of the upper nozzle and the latch sleeve in the coupling structure of the fuel assembly according to the present invention.

As shown in FIG. 7, the lock key 20 is rotatably attached to a latch sleeve installation hole 31 of the upper nozzle 30. A structure of an inner surface of the latch sleeve installation hole 31 will be described in detail in later-described first and second embodiments.

Next, described is how the latch sleeve and the lock key are coupled to each other according to the coupling structure of the fuel assembly of the present invention.

Figure 6:
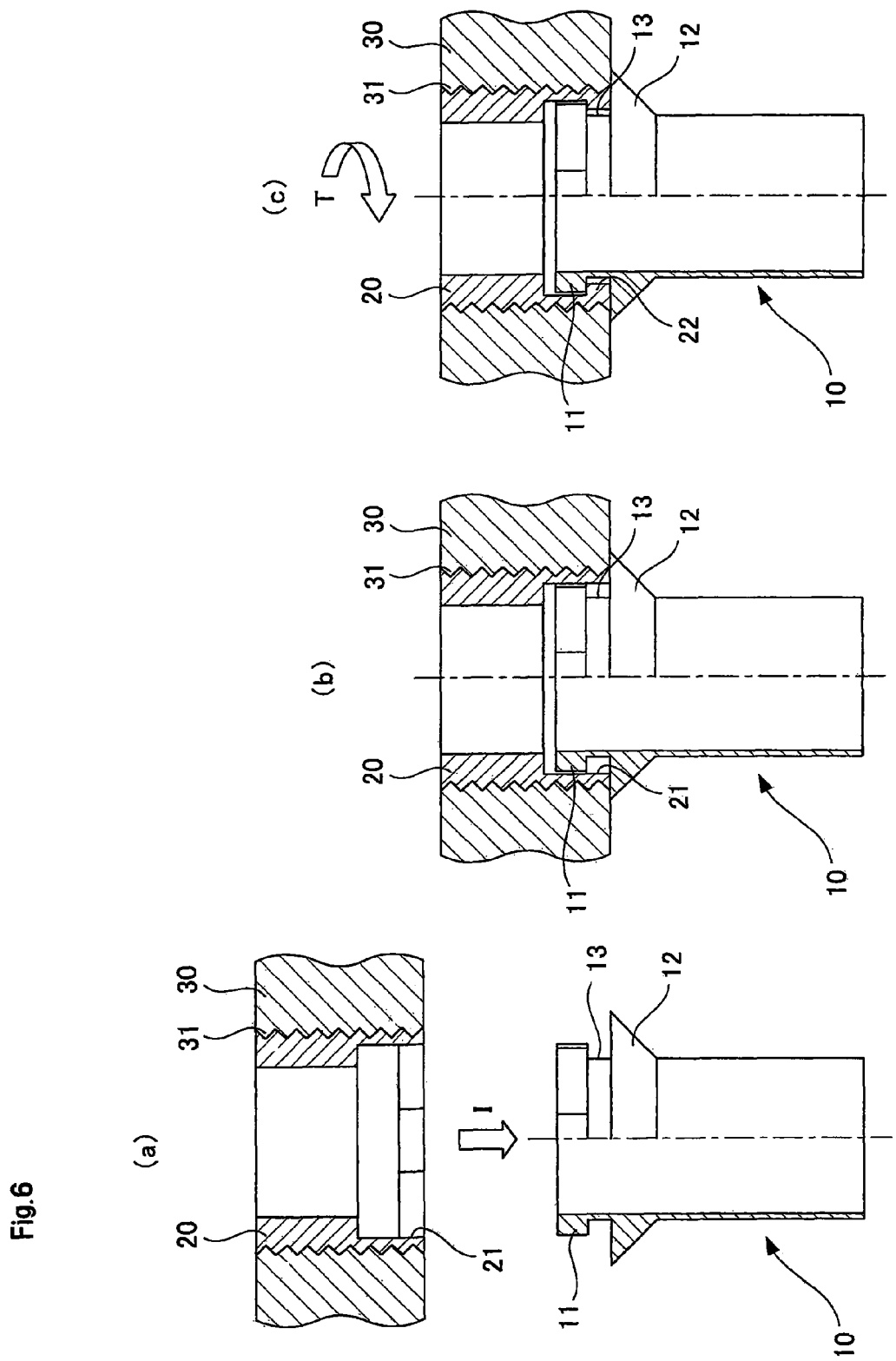
FIG. 6 is a view showing how the latch sleeve and the lock key are coupled to each other in the coupling structure of the fuel assembly according to the present invention.

In FIG. 6, part (a) of FIG. 6 is a view showing a state where the lock key is to be inserted onto the latch sleeve; part (b) of FIG. 6 is a view showing a state where the lock key has just been inserted onto the latch sleeve; part (c) of FIG. 6 is a view showing a state where the latch sleeve and the lock key are coupled to each other by rotating the lock key after the lock key is inserted onto the latch sleeve.

As shown in FIG. 6, the latch sleeve 10 is inserted into the lock key opening portion 21 attached to the upper nozzle 30, in a direction indicated by arrow I until the upper-nozzle fixing portion 12 of the latch sleeve 10 contacts the bottom surface of the upper nozzle 30. Then, the lock key 20 is rotated in a direction indicated by arrow T by 45 degrees, and the receiver portion 22 of the lock key 20 enters the gap portion 13 of the latch sleeve 10. Here, fitting is achieved when the projecting portion 11 of the latch sleeve 10 overlaps the receiver portions 22 of the lock key 20, and the latch sleeve 10 is caused not to fall from the lock key 20. Thus, the latch sleeve 10 and the upper nozzle 30 are coupled to each other.

Moreover, the lock key 20 may be pulled out from the latch sleeve 10 by rotating (45 degrees in this case) the lock key 20 until there is no overlap between the projecting portion 11 of the latch sleeve 10 and the receiver portion 22 of the lock key 20, thereby detaching the upper nozzle 30.

Note that the projecting portion 11 of the latch sleeve 10 may be a triangle or a polygon shape instead of a square shown in FIGS. 4 to 6. Moreover, the projecting portion 11 formed at the upper end portion of the latch sleeve 10 may be a flower shape or the like as shown in FIG. 8. The rotating angle of the lock key 20 required for the receiver portion 22 of the lock key 20 to overlap the projecting portion 11 of the latch sleeve 10 may be decided as necessary according to the shape of the projecting portion 11. In FIG. 8, part (a) of FIG. 8 is a side view of a latch sleeve with a flower-shaped projecting portion; part (b) of FIG. 8 is a top view of the latch sleeve with the flower-shaped projecting portion.

Embodiment 1

Next, described is a coupling structure of a fuel assembly according to the first embodiment of the present invention.

Figure 1:
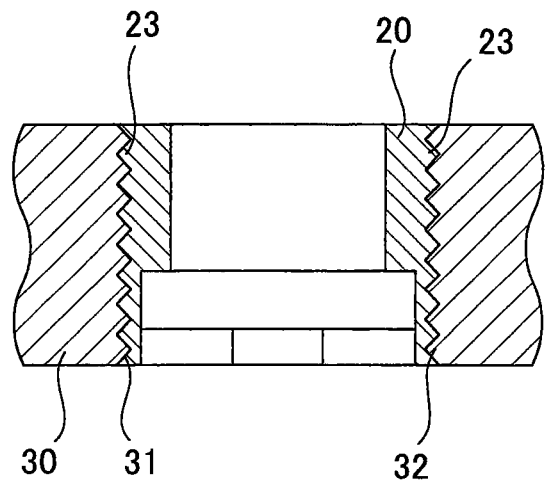
FIG. 1 is a view showing a coupling structure of a fuel assembly according to a first embodiment of the present invention.

As shown in FIG. 1, the male screw thread 23 is formed on the side surface of the lock key 20. A female screw thread 32 is formed on an inner surface of the latch sleeve installation hole 31 of the upper nozzle 30. The lock key 20 is installed inside the latch sleeve installation hole 31, and the lock key 20 and the latch sleeve installation hole 31 are screw-coupled to each other.

According to the present embodiment described above, the coupling of the lock key 20 and the latch sleeve 10 (see FIG. 6) can be released and the upper nozzle 30 can thus be detached, without completely detaching the lock key 20 from the latch sleeve installation hole 31. Accordingly, there is no need to disassemble components at the time of attaching and detaching the upper nozzle 30. Thereby, a factor leading to mixing of a detached component in the fuel assembly is eliminated.

Moreover, the lock key 20 moves up and down vertically by rotating the lock key 20 along the female screw thread 32 formed on the inner surface of the latch sleeve installation hole 31. This movement allows no gap to be generated between the receiver portion 22 (see FIG. 6) of the lock key 20 and the bottom surface of the projecting portion 11 (see FIG. 6) of the latch sleeve 10. Accordingly, no vertical play can be generated at the fitting portion between the lock key 20 and the latch sleeve 10 at the time of coupling, and a gap can be made at the fitting portion between the lock key 20 and the latch sleeve 10 at the time of releasing the coupling.

Embodiment 2

Next, described is a coupling structure of a fuel assembly according to the second embodiment of the present invention.

Firstly, a background of the present embodiment will be described. In the above described coupling structure of the fuel assembly according to the first embodiment, when coupled to or released from the latch sleeve 10, the lock key 20 moves up and down vertically by being rotated along the female screw thread 32 formed on the inner surface of the latch sleeve installation hole 31.

Accordingly, in order for the vertical play not to be generated at the time of the coupling of the lock key 20 and latch sleeve 10, there is a need to adjust at least a processing start position for the female screw thread 32 formed on the inner surface of the latch sleeve installation hole 31 of the upper nozzle 30.

Moreover, when the upper nozzle 30 is attached as the fuel assembly, not to allow the play to be generated at the time of the coupling, the processing start position for the female screw thread 32 formed on the inner surface of the latch sleeve installation hole 31 of the upper nozzle 30 need to be adjusted with respect to all the lock keys 20 to be installed in the upper nozzle 30.

To solve this problem, in the present embodiment, the cylindrical thick-walled pipe 40 (see FIG. 2) described later is provided for easy adjustment of the processing start position for a female screw thread on the upper nozzle 30. The present embodiment has a structure in which the thick-walled pipe 40 is installed inside the lock key 20.

Figure 2:
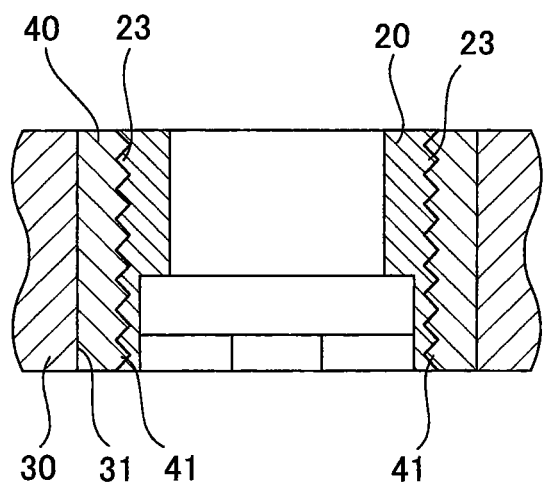
FIG. 2 is a view showing a coupling structure of a fuel assembly according to a second embodiment of the present invention.

As shown in FIG. 2, the thick-walled pipe 40 is cylindrical, and a female screw thread 41 is formed on an inner surface of the thick-walled pipe 40. Note that the present embodiment is different from the first embodiment in that the inner surface of the latch sleeve installation hole 31 and the outer surface of the thick-walled pipe 40 are smooth surfaces, and that the thick-wall pipe 40 is rotatably installed in the latch sleeve installation hole 31 of the upper nozzle 30.

For each thick-walled pipe 40 installed in the corresponding latch sleeve installation hole 31 of the upper nozzle 30, a processing start position for the female screw thread 41 formed on the inner surface of the thick-walled pipe 40 is adjusted by adjusting an installation angle so that no vertical play is generated at the time of the coupling of the lock key 20 and the latch sleeve 10. These thick-walled pipes 40 are joined to the upper nozzle 30 by welding or like after being adjusted of their installation angles. Thereafter, the lock keys 20 are installed inside the thick-walled pipes 40 joined to the upper nozzle 30.

According to the present embodiment described above, the following effect can be obtained in addition to the effects of the first embodiment. In the present embodiment, there is no need to consider the processing start position when forming a screw thread on the latch sleeve installation hole 31 of the upper nozzle 30. Specifically, it is possible to optimize the processing start positions for the female screw threads 41 formed on the thick-walled pipes 40 only by adjusting the thick-walled pipes 40 individually so that no vertical play may be generated at the time of the coupling by the thick-walled pipe 40 and then by respectively joining the thick-walled pipes 40 and upper end portions 108 of the upper nozzle 30 by welding or like. Accordingly, no vertical play is generated at each of the coupling positions provided in the upper nozzle 30.

Embodiment 3

Next, described is a coupling structure of a fuel assembly according to a third embodiment of the present invention.

The lock key 20 according to the above described first and second embodiments has the following problem. When the lock key 20 rotates due to some reason and becomes loose, the fitting portion between the lock key 20 and the latch sleeve 10 may be released or the vertical play may be generated. To solve this problem, a rotation prevention structure needs to be provided for the lock key 20 to prevent the lock key 20 from rotating and becoming loose.

As the rotation prevention structure, conventional industrial methods such as caulking, pinning, and welding may be used. However, when these methods are used, quick attachment (preventing the lock key 20 from becoming loose) and detachment of the upper nozzle 30 cannot be performed in the power station or the like. To solve this problem, in the present embodiment, a later described reel hole 60 (see FIG. 3) is formed at the upper end portion of the lock key 20, the reel hole 60 having a cross section other than a circle. In addition, a projecting portion 61 (see FIG. 3) is provided at a position in an axial direction of a later-described thimble plug 51 (see FIG. 10). The projecting portion 61 fits into the reel hole 60 when the thimble plug 51 is inserted.

Figure 9:
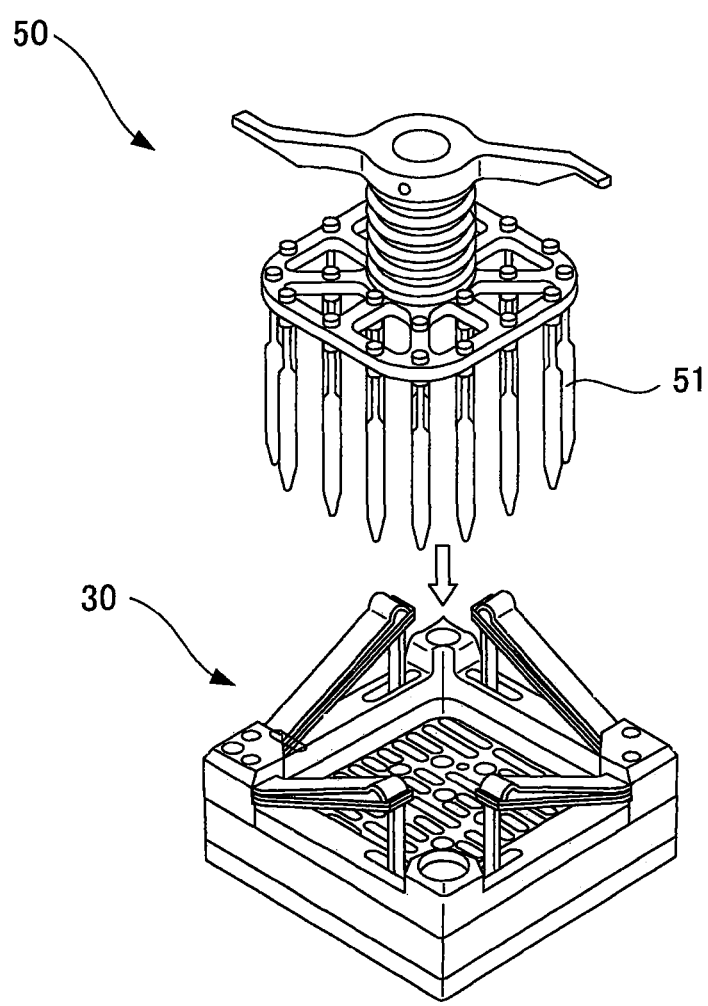
FIG. 9 is a view showing a thimble plug assembly in the coupling structure of the fuel assembly according to the present invention.
Figure 10:
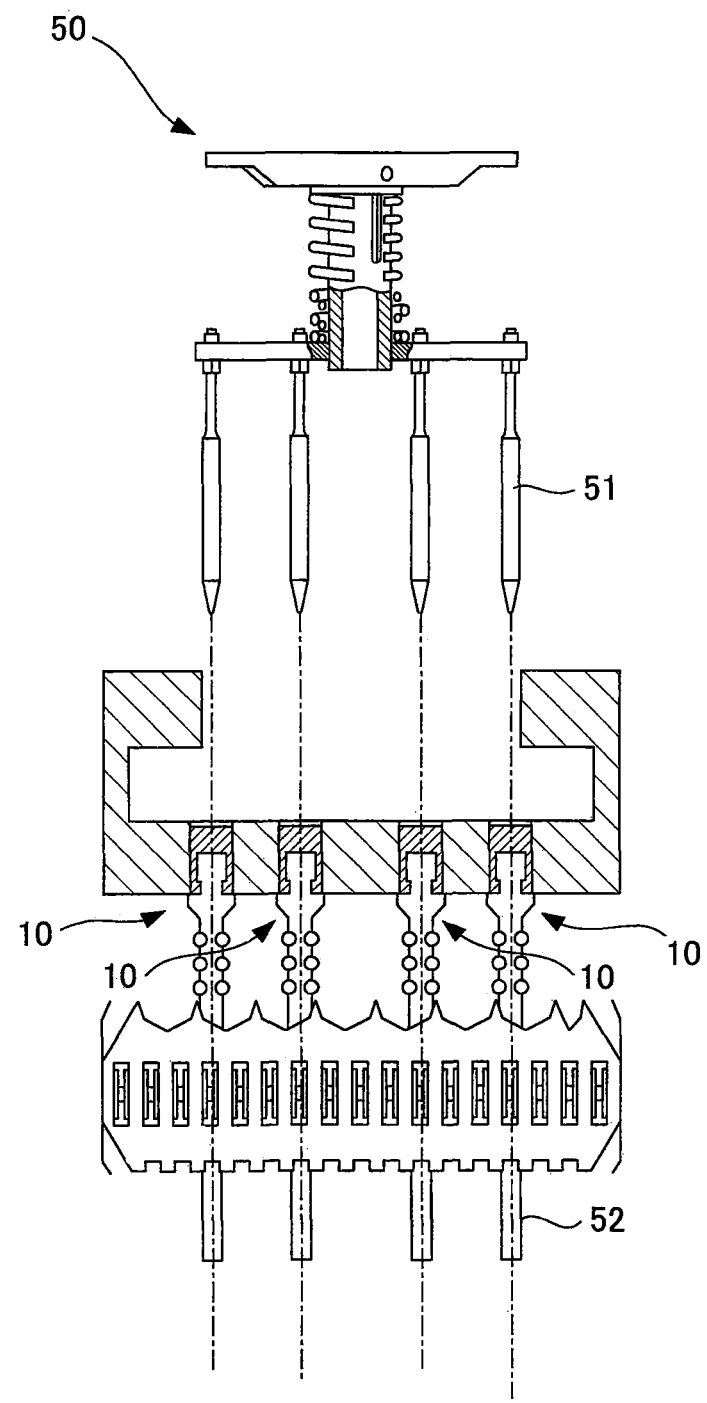
FIG. 10 is a view showing how thimble plugs are inserted, in the coupling structure of the fuel assembly according to the present invention.
Figure 11:
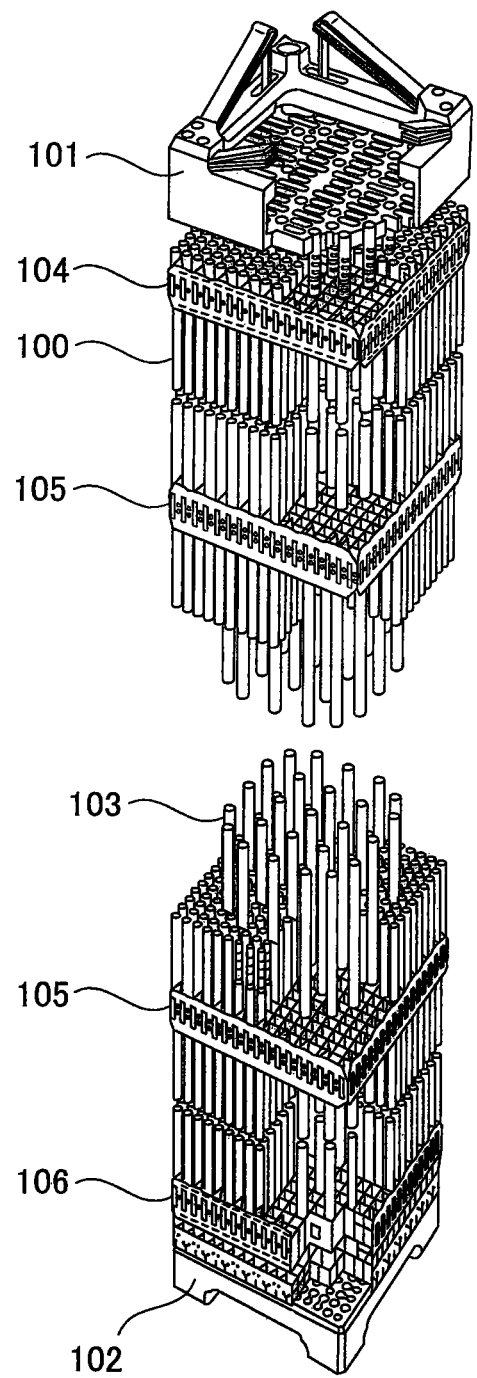
FIG. 11 is a view showing a structure of a fuel assembly of a conventional pressurized-water nuclear reactor.
Figure 12:
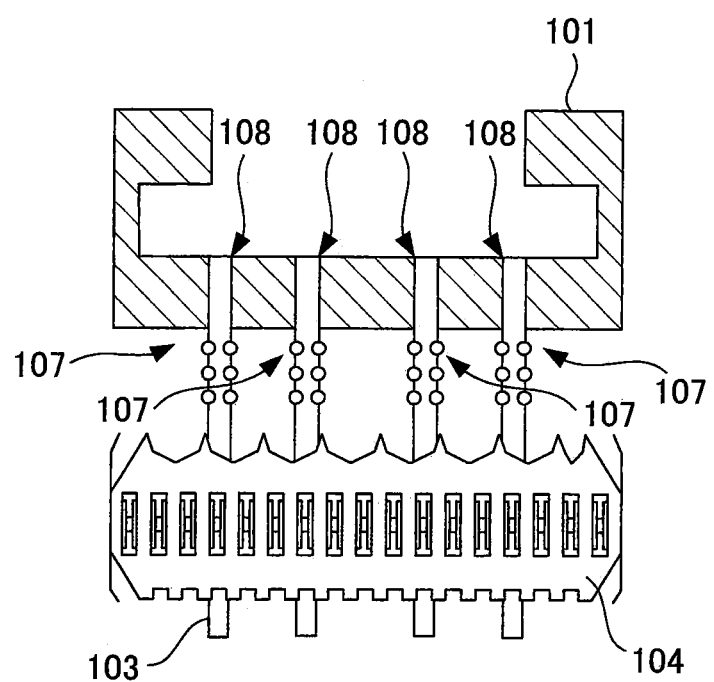
FIG. 12 is a view showing a structure where upper nozzles and latch sleeves are joined to each other in the fuel assembly of the conventional pressurized-water nuclear reactor.
Figure 13:
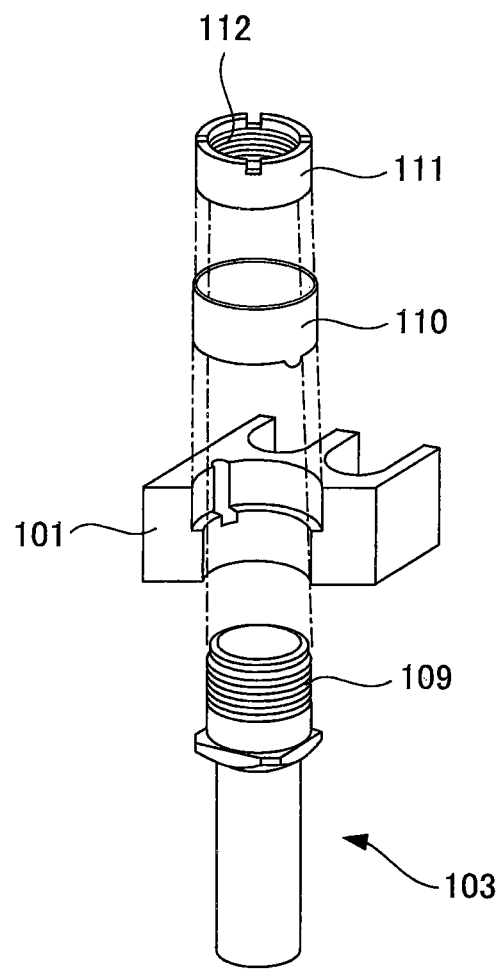
FIG. 13 is a view showing a coupling structure of a fuel assembly using a conventional nut.

Now, described are the thimble plugs of the coupling structure of the fuel assembly according to the third embodiment of the present invention. In a pressurized-water nuclear reactor, the thimble plugs 51 attached to a thimble plug assembly 50 as shown in FIG. 9 are inserted into the latch sleeves 10 of the upper nozzle 30 and guide tubes 52 mechanically joined to the inside of the latch sleeves 10 as shown in FIG. 10, respectively, thereby controlling reactor bypass flow occurring when coolant flows in the guide tubes 52.

Figure 3:
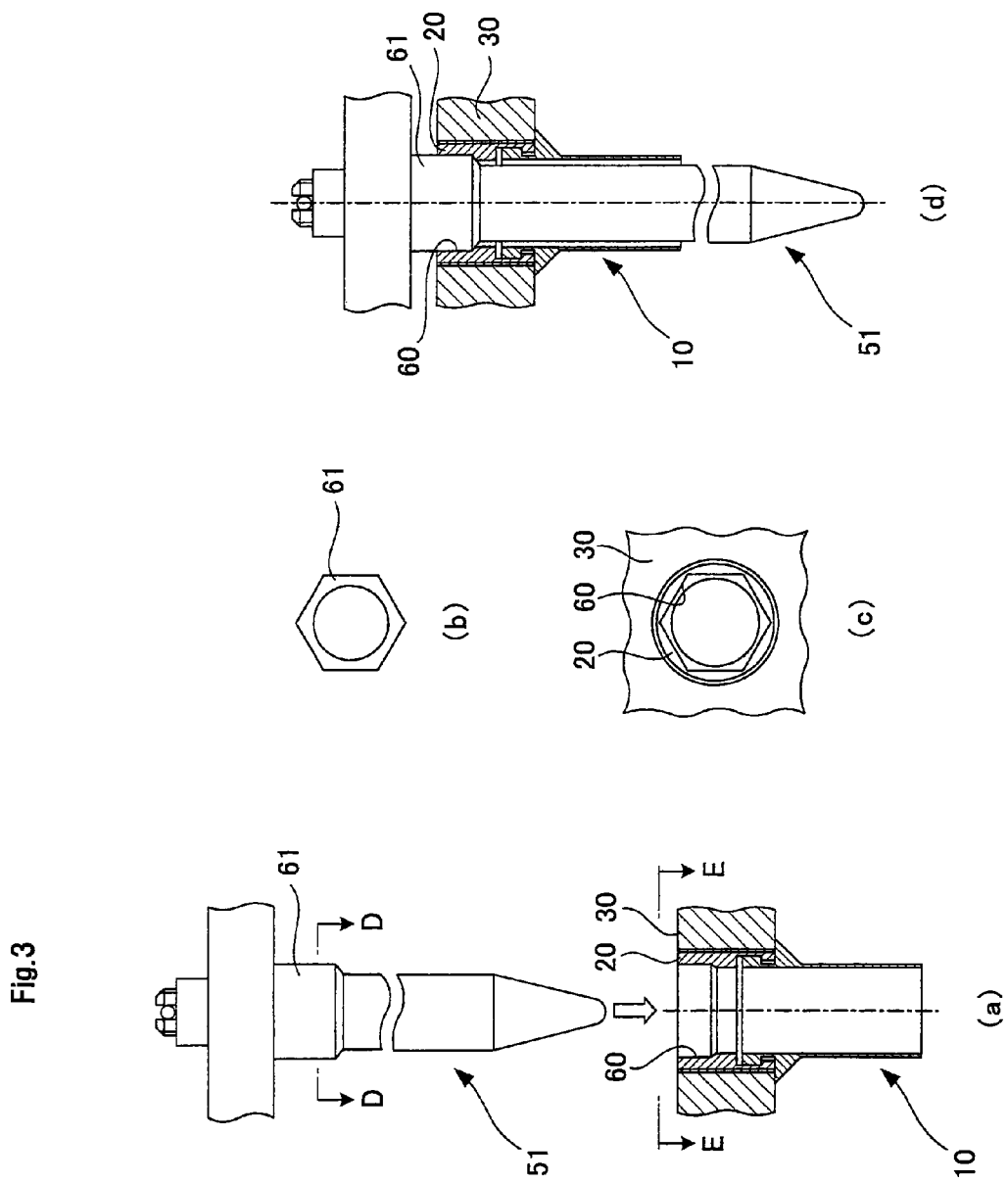
FIG. 3 is a view showing a rotation prevention structure for a lock key in a coupling structure of a fuel assembly according to a third embodiment of the present invention.

In FIG. 3, part (a) of FIG. 3 is a view showing a state where the thimble plug is to be inserted into the lock key and the latch sleeve; part (b) of FIG. 3 is a cross-sectional view of the thimble plug projecting portion taken along a cross section D-D shown in part (a) of FIG. 3; part (c) of FIG. 3 is a top view of the lock key when viewed in a direction E-E shown in part (a) of FIG. 3; part (d) of FIG. 3 is a view showing a state where the thimble plug has been inserted into the lock key and the latch sleeve.

As shown in FIG. 3, the hexagonal reel hole 60 is formed in the upper portion of the lock key 20. If the hexagonal projecting portion 61 is formed at the position in the axial direction of the thimble plug 51, the projecting portion 61 fitting into the hexagonal reel hole 60 at the time of insertion of the thimble plug 51, the hexagonal thimble plug projection portion 61 of the thimble plug 51 fits into the hexagonal reel hole 60 by the insertion of the thimble plug 51 into the reel hole 60. Thereby, the lock key 20 can be prevented from rotating.

As described above, the coupling structure of the fuel assembly is characterized as follows. The structure includes the thimble plugs 51 inserted into the lock keys 20 and latch sleeves 10, respectively. In addition, the reel hole 60 having a shape other than a circle is formed on the upper portion of each lock key 20, and the projecting portion 61 having a shape which fits into the reel hole 60 is formed on each thimble plug 51 as the thimble plug projecting portion 61. Each lock key 20 is prevented from rotating by fitting the thimble plug projecting portion 61 into the reel hole 60.

Note that, although the reel hole 60 is hexagonal in the present embodiment as an example, other configurations may be adopted. For example, the reel hole 60 may have another shape not being a circle, for example a polygon or a structure with keys on the surface. The shape of the thimble plug projection portion 61 may be decided according to the decided shape of the reel hole 60 so that the thimble plug projection portion 61 may fit into the reel hole 60.

As described above, according to the present embodiment, since the projection portions 61 provided on the thimble plugs 51 fit into the reel holes 60 of the lock keys 20, the lock keys 20 are prevented from rotating only by inserting the thimble plugs 51 into the lock keys 20 and the latch sleeves 10.

INDUSTRIAL APPLICABILITY

The present invention can be applied to, for example, a coupling structure between an upper nozzle and an upper end of a guide tube, of a fuel assembly used in a pressurized-water nuclear reactor.

The invention claimed is:

1. A coupling structure of a fuel assembly comprising:
    a latch sleeve having a projecting portion formed at an upper end portion thereof;
    an upper nozzle having formed therein a latch sleeve installation hole configured to receive the upper end portion of the latch sleeve;
    a lock key, installed inside the latch sleeve installation hole, comprises an opening portion formed in a bottom surface of the lock key, the opening portion having a shape corresponding to the projecting portion, in which the latch sleeve and the lock key are coupled to each other to form the coupling structure of the fuel assembly by rotating the lock key with the upper end portion of the latch sleeve inserted into the lock key;
    a flange portion formed at a portion of the latch sleeve arranged below the projecting portion; and
    a gap portion formed at a portion of the latch sleeve arranged between the projecting portion and the flange portion, wherein
    the coupling structure of the fuel assembly comprises a screw coupling means for screw-coupling the lock key to the upper nozzle side with a male screw thread formed on a side surface of the lock key,
    the flange portion is configured to contact a bottom surface of the upper nozzle,
    the gap portion is configured to accommodate a receiver portion of the lock key, and
    the screw coupling means is a position adjustment means for filling a vertical gap between the receiver portion and the bottom surface of the projecting portion by moving the lock key up by rotating the lock key with the male thread formed on the lock key being screw coupled with the upper nozzle side so that a vertical play is eliminated at a fitting portion between the lock key and the latch sleeve.

2. The coupling structure of a fuel assembly according to claim 1 characterized in that the screw coupling means screw-couples the lock key and the latch sleeve installation hole with a female screw thread formed on an inner surface of the latch sleeve installation hole.

3. The coupling structure of a fuel assembly according to claim 1 characterized in that
    the screw coupling means includes a cylindrical thick-walled pipe installed in the latch sleeve installation hole, the thick-walled pipe having a female screw thread thread formed in an inner surface thereof, and
    the screw coupling means screw-couples the lock key and the thick-walled pipe by installing the lock key in the thick-walled pipe.

4. The coupling structure of a fuel assembly according to claim 1, wherein the screw coupling means does not comprise a detachable nut.

5. A coupling method for a coupling structure of a fuel assembly comprising:
    a latch sleeve having a projecting portion formed at an upper end portion thereof;
    an upper nozzle having formed therein a latch sleeve installation hole into which the upper end portion of the latch sleeve is inserted, a lock key which is installed inside the latch sleeve installation hole, and which has an opening portion formed in a bottom surface thereof, the opening portion having a shape corresponding to the projecting portion;
    a screw coupling means for screw-coupling the lock key to the latch sleeve installation hole by a male thread formed on a side surface of the lock key and a female thread formed on an inner surface of the latch sleeve installation hole;
    a flange portion formed at a portion of the latch sleeve arranged below the projecting portion and configured to contact a lower surface of the upper nozzle;
    a gap portion formed at a portion of the latch sleeve arranged between the projecting portion and the flange portion; and
    a receiver portion formed in the opening portion and configured to enter the gap portion, in which the latch sleeve and the lock key are coupled to each other by rotating the lock key with the upper end portion of the latch sleeve being inserted into the lock key so that the projecting portion and the receiver portion are placed over each other,
    the coupling method comprising:
    performing position adjustment using the screw coupling means to fill a vertical gap between an upper surface of the receiver portion and a bottom surface of the projecting portion by moving the lock key up by rotating the lock key with the male thread being screw coupled with the female screw so that a vertical play is eliminated at a fitting portion between the lock key and the latch sleeve.

\* \* \* \* \*